US 12,050,356 B2

(12) United States Patent
Meyer et al.

(10) Patent No.: US 12,050,356 B2
(45) Date of Patent: Jul. 30, 2024

(54) SPLITTER FAN OUT BOX FOR OPTICAL FAN OUT MODULE

(71) Applicant: HUBER+SUHNER AG, Herisau (CH)

(72) Inventors: Reto Meyer, Stäfa (CH); Erdem Pala, Abtwil (CH)

(73) Assignee: HUBER+SUHNER AG, Heirsau (CH)

( * ) Notice: Subject to any disclaimer, the term of this patent is extended or adjusted under 35 U.S.C. 154(b) by 0 days.

(21) Appl. No.: 17/538,251

(22) Filed: Nov. 30, 2021

(65) Prior Publication Data

US 2023/0168454 A1    Jun. 1, 2023

(51) Int. Cl.
  *G02B 6/44* (2006.01)
  *G02B 6/28* (2006.01)
(52) U.S. Cl.
  CPC ......... *G02B 6/4447* (2013.01); *G02B 6/4455* (2013.01); *G02B 6/4472* (2013.01); *G02B 6/2804* (2013.01)
(58) Field of Classification Search
  CPC .. G02B 6/4447; G02B 6/4455; G02B 6/4472; G02B 6/2804
  See application file for complete search history.

(56) References Cited

U.S. PATENT DOCUMENTS

| | | | |
|---|---|---|---|
| 2005/0013115 A1* | 1/2005 | Hwang | G02B 6/4277 361/690 |
| 2007/0189691 A1* | 8/2007 | Barth | G02B 6/4452 385/134 |
| 2011/0228473 A1* | 9/2011 | Anderson | G02B 6/428 361/679.02 |
| 2016/0033731 A1* | 2/2016 | Cabanne Lopez | G02B 6/4452 385/135 |

FOREIGN PATENT DOCUMENTS

EP    3 757 640 A1    12/2020

* cited by examiner

*Primary Examiner* — Sung H Pak
*Assistant Examiner* — Hoang Q Tran
(74) *Attorney, Agent, or Firm* — Pauley Erickson & Swanson

(57) ABSTRACT

An SFO-box (1) suitable to receive at least one optical fan out module (6). The SFO-box (1) includes a housing (2) with a base (3) and a top (4) which in an assembled position encompass a mounting space (5) suitable to receive the at least one optical fan out module (6) therein. The top (4) includes first fastening means (7) and the base (3) comprises second fastening means (8) which from their layout are compatible to each other such that two assembled housings (2) can be attached to each other in a stackable manner by interconnecting the first fastening means (7) of the top (4) and the second fastening means (8) of the base (3).

8 Claims, 2 Drawing Sheets

SPLITTER FAN OUT BOX FOR OPTICAL FAN OUT MODULE

BACKGROUND OF THE INVENTION

Field of the Invention

The present disclosure relates to a Splitter Fan Out Box (SFO-box) suitable to receive at least one optical fan out module.

Discussion of Related Art

EP3757640 was on behalf of Optonet first published in December 2020. It relates to an optical fan out module, in particular in the form of a passive optical network component which comprises a cassette housing. At least one optical splitter, at least one splice holder and at least one fiber reservoir for accommodating optical fibers are present in the housing. The housing has at least one first cable passage on a first side, via which at least one first optical fiber cable can be introduced into the housing and, on an opposite side of the housing, at least one second cable passage via which at least one second optical cable can be introduced into the housing. The fiber reservoir and the at least one splitter are arranged one behind the other in the housing in a direction from the first cable passage to the second cable passage.

SUMMARY OF THE INVENTION

The disclosure is directed to a device and system to efficiently splice a large number of optical fiber connections, in particular optical fiber connections which are spliced in at least one optical fan out module.

The disclosure preferably qualifies for WAN/Access Network customers who are looking for a cost efficient, space saving and easy-to-install solution for NG-PON-applications connecting an optical line terminal (OLT) to an optical distribution frame (ODF) in a central office or similar environment. NG-PON stands for Next-Generation Passive Optical Network which is a 2015 telecommunications network standard for a passive optical network. The disclosure addresses the problem of lack of space in central offices, datacenters or similar facilities in that it offers clean and clear storage of the cables in datacenter or similar buildings and puts a focus on easy to install. In a preferred variation, the disclosure addresses these topics by a splitter fan out (SFO) arrangement which is modular and scalable in two ways: Inside every SFO-box there is the possibility to stack up to e.g., six splitter fan out (optical fan out modules). There is the possibility to e.g., add up to three SFO-boxes from a cabinet wall in a stacked manner. Good results are achieved, when in a mounted position in- and outgoing cables are leaving the box downwards. Advantages are a very small footprint; if requested SFO-box comes with ready prepared connectivity adapters/connectors. If appropriate, inside the box there is a mandrill which gives the possibility to manage the fibers. The SFO-box offers the possibility to be install the solution in a rack or on a wall, as it can be designed not be linked to a specific rack type/brand. In a preferred variation the disclosure relates to a SFO-box which comprises a housing with a base and a top which in an assembled position, in which they are interconnected to each other, encompass a mounting space. The mounting space is foreseen to receive at least one optical fan out module therein, e.g., in the form of an optical module as mentioned hereinabove with respect to the prior art.

A very space saving arrangement can be achieved when the top of the housing comprises first fastening means, e.g., in the form of screw holes, and the base of the housing comprises second fastening means, e.g., in the form of screw holes, which are from their layout compatible to each other such that the base of an above second housing can be attached to the top of an underneath first housing. Thereby the housings of at least two SFO-boxes can be attached to each other in a stackable manner in a first direction by interconnecting the first fastening means of the top of the underneath housing to the second fastening means of the base of the above second housing, e.g., by screws.

An advantageous design can be achieved when the base and the top of the housing are having an essentially L-shaped cross-section interconnectable to each other such that the housing is having an essentially rectangular cross-section.

The base and/or the top of the housing usually comprise at least one mounting means suitable to receive at least one optical fan out module. Good results can be achieved when the mounting means comprises at least one retaining mandrel onto which the at least one optical fan out module which comprises a thereto corresponding opening can be pushed onto.

A very cost efficient design can be achieved, when the base and the top are in a mounted position interconnected to each other by screws. The thereto related fastening means (i.e., screw holes) are preferably arranged such that the screws remain accessible even when several housings are arranged in a stack. Thereby it becomes possible to access a lower housing even when an upper housing is attached to the lower housing. Alternatively, or in addition, the base and the top can be in a mounted position interconnected to each other by at least one hinge. Good results can be achieved when the base and the top are made from bend sheet metal and/or injection molded plastic material. The housing usually comprises an opening for routing of optical cables coming from and going to the at least one optical fan out module arranged inside the housing. In a mounted position, the opening is preferably arranged at the lower end of the housing. The opening is preferably formed by, respectively between the base and the top of the housing.

The base and/or the top of the housing may comprise a deflector for deflecting of at least one optical cable. In a mounted position of the housing the deflector is preferably arranged in the area of the upper end of the housing and the at least one optical fan out module underneath. An optical cable with can be deflected by the deflector before it enters the optical fan out module. The base and/or the top of the housing may comprise at least one adapter to interconnect two optical connectors to each other. To mount the housing to a wall, a base plate can be foreseen which, similar to the top, comprises third fastening means which are compatible to the second fastening means of the base, such that base of the housing can be attached via the second fastening means of the base to the third fastening means of the base plate.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF SEVERAL VIEWS OF THE DRAWINGS

The herein described disclosure will be more fully understood from the detailed description given herein below and the accompanying drawings which should not be considered limiting to the disclosure described in the appended claims. The drawings are showing:

DESCRIPTION OF PREFERRED EMBODIMENTS

Reference will now be made in detail to certain embodiments, examples of which are illustrated in the accompanying drawings, in which some, but not all features are shown. Indeed, embodiments disclosed herein may be embodied in many different forms and should not be construed as limited to the embodiments set forth herein; rather, these embodiments are provided so that this disclosure will satisfy applicable legal requirements. Whenever possible, like reference numbers will be used to refer to like components or parts.

Figure 1:
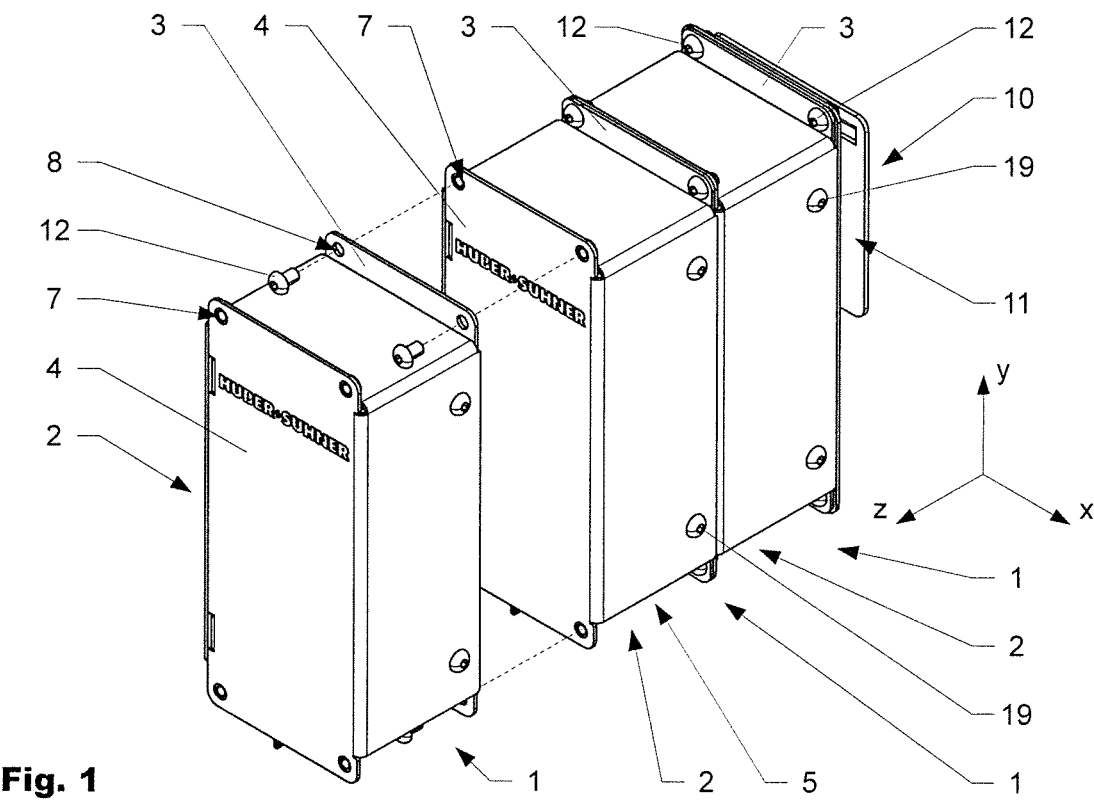
FIG. 1 shows a stack of SFO-boxes in a perspective view from above and the front.
Figure 2:
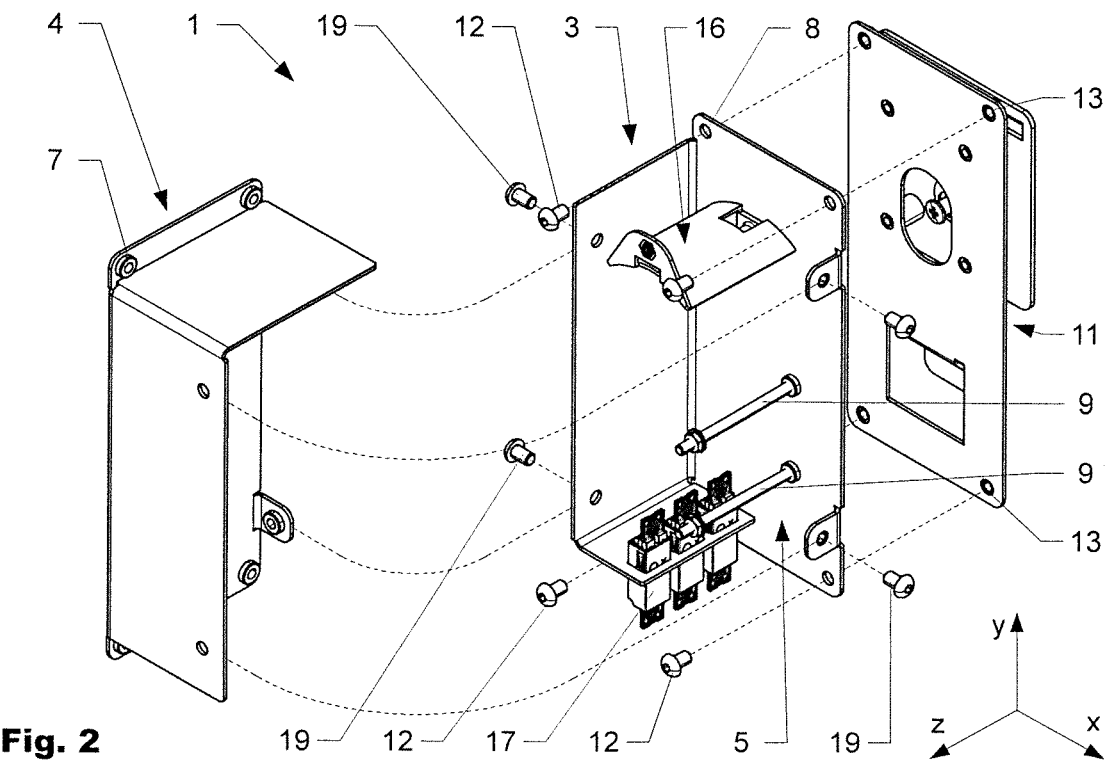
FIG. 2 shows an SFO-box in a disassembled view and a base plate.
Figure 3:
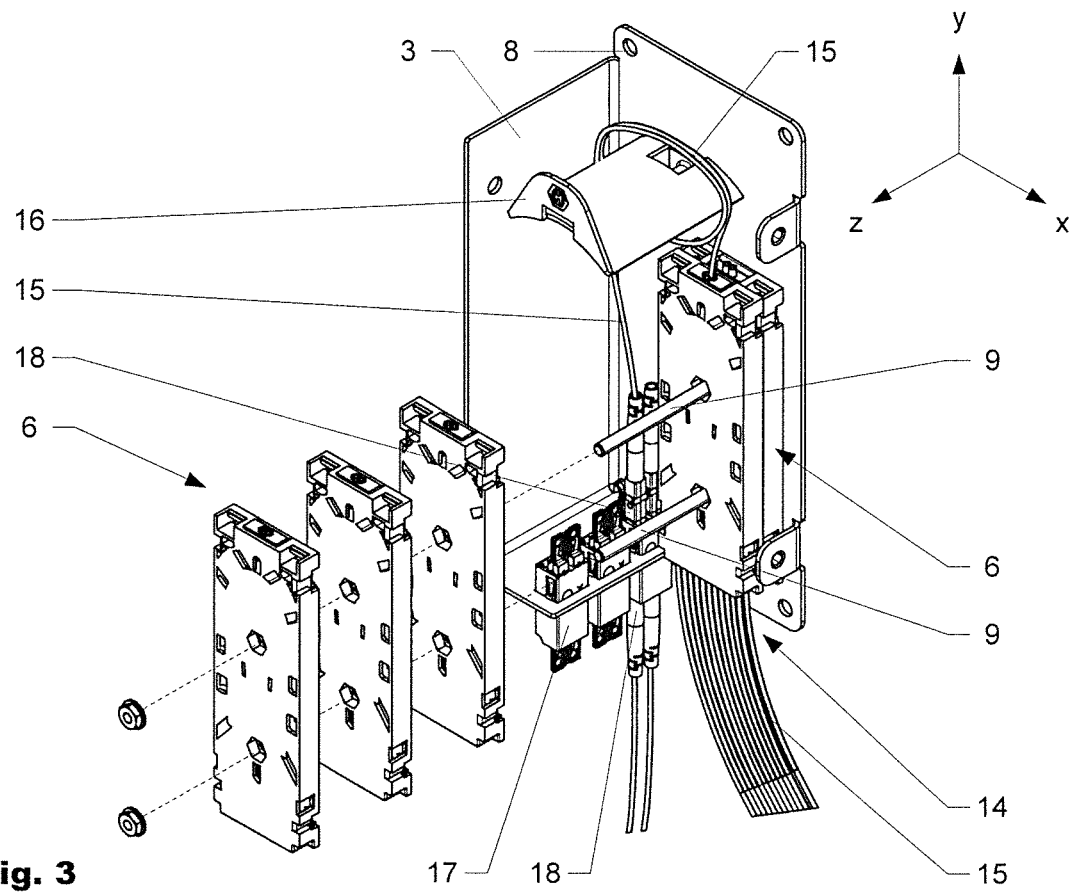
FIG. 3 shows an SFO box in an open position with several optical fan out modules.
Figure 4:
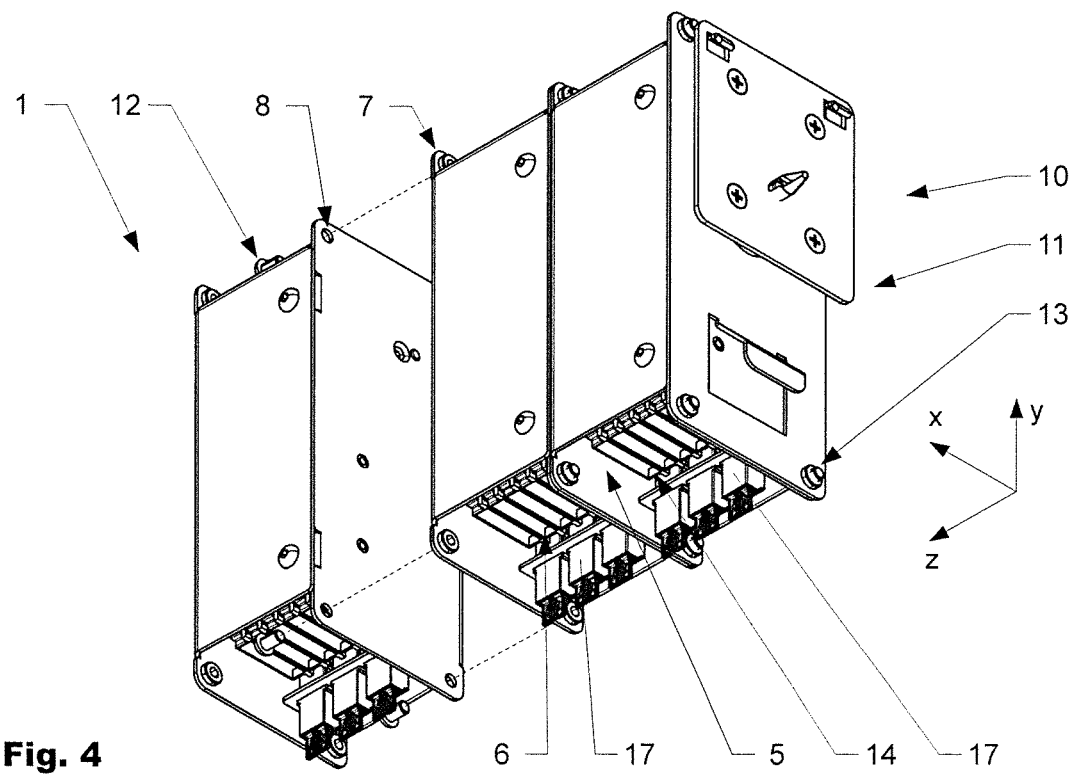
FIG. 4 shows the stack according to FIG. 1 in a perspective view from below and the rear.

FIG. 1 shows a stack of SFO-boxes 1 in a perspective view from the front and above. FIG. 2 shows an SFO-box 1 according to FIG. 1 in an exploded view along with a base plate 11. FIG. 3 is showing the inside of an SFO-box. FIG. 4 is showing the stack of SFO-boxes 1 in a perspective view from the back and below.

In the shown variation, the in a first direction (z-direction) stackable SFO-box 1 comprises a housing 2 with a base 3 and a top 4 which in an assembled position, as e.g., shown in FIG. 1 and FIG. 4, encompass a mounting space 5 suitable to receive at least one optical fan out module 6 (see FIG. 3) therein. The top 4 comprises first fastening means 7 and the base 3 comprises second fastening means 8 which are with respect to their layout compatible to each other such that two assembled housings 2 can be attached to each other in a stackable manner by interconnecting the first fastening means 7 of the top 4 and the second fastening means 8 of the base 3 by first screws 12 as e.g., shown in FIG. 1 and FIG. 4. In the shown variation the screws are arranged in the first direction (z-direction). At least one of the fastening means 7, 8 can be equipped with a thread.

As shown, the base 3 and the top 4 can have an essentially L-shaped cross-section interconnectable to each other to form the housing 2 which in the assembled position is having an essentially rectangular cross-section. In the shown variation, the base 3 and the top 4 are interconnected to each other by second screws 19 which are arranged in a second direction (x-direction) perpendicular to the first direction (z-direction). Thereby the housing 2 can be opened via the second screws even though the stack is not disassembled. The base 3 and/or the top 4 may comprise at least one mounting means 9 suitable to receive at least one optical fan out module 6. As visible in FIG. 2, the mounting means 9 can be in the form of a retaining mandrel 9 onto which the at least one optical fan out module 6 can be pushed onto as schematically indicated in FIG. 3. The base 3 and the top 4 of two adjacent housings 2 are in a stacked position interconnected to each other by first screws 12. The base 3 and the top 4 of one housing 2 are interconnected to each other by second screws 19. Alternatively, or in addition, the base 3 and the top 4 can in a mounted position be interconnected to each other by at least one hinge (not shown in detail). Good results can be achieved when the base 3 and the top 4 are made from bend sheet metal and/or injection molded plastic material. If made from sheet metal or injection molded plastic material, the hinge can be integrated into the material. The housing 2 preferably comprises in a mounted position an opening 14 for routing of optical cables 15 coming from and going to the at least one optical fan out module 6 arranged inside the housing 2 wherein the opening 14 is in particular arranged at the lower end of the housing 2. As e.g., visible in FIG. 4, the opening 14 is formed by the base 3 and the top 4 of the housing 2. This offers the advantage that the inside becomes fully accessible and thereby the routing of the optical cable 15 very easy, when the top 4 is separated from the bottom 3 of one housing. The base 3 and/or the top 4 of the housing 2 may comprise a deflector 16 for deflecting of the at least one optical cable 15, wherein in a mounted position of the housing 2 the deflector 16 is in particular arranged in the area of the upper end of the housing 2. The base 3 and/or the top 4 of the housing 2 may comprise at least one adapter 17 to interconnect two optical connectors 18 to each other. The adapter 17 is preferably arranged in the area of the opening 14. If appropriate a fixture 20 can be foreseen as e.g., visible in FIG. 3 and FIG. 4 to mount the adapter 17 in the housing 2. Usually SFO-box system 10 comprises at least one splitter SFO-box 1 as described above and a base plate 11. The base plate 11 usually comprises third fastening means 13 suitable to connect to the second fastening means 8 of the base 3 of the housing 2.

Rather, the words used in the specification are words of description rather than limitation, and it is understood that various changes may be made without departing from the Spirit and scope of the disclosure.

It is claimed:

1. An SFO-box (1) suitable to receive at least one optical fan out module (6), the SFO-box (1) comprising:
   (a) a housing (2) consisting of a base (3) and a top (4) which in an assembled position encompass a mounting space (5) suitable to receive the at least one optical fan out module (6) therein; wherein
   (b) the top (4) comprises first fastening means (7) and the base (3) comprises second fastening means (8) which from their layout are compatible to each other such that two assembled housings (2) can be attached to each other in a stackable manner by interconnecting the first fastening means (7) of the top (4) and the second fastening means (8) of the base (3), wherein the base (3) and the top (4) are each one-piece and include an essentially L-shaped cross-section interconnectable to each other to form at least part of the housing (2) having an essentially rectangular cross-section;
   (c) wherein the mounting space completely encloses the at least one optical fan out module (6) therein;
   (d) wherein the housing (2) comprises in a mounted position an opening (14) for routing optical cables (15) coming from and going to the at least one optical fan out module (6) arranged inside the housing (2) wherein the opening (14) is arranged at the lower end of the housing (2);
   (e) wherein the top (4) of the housing (2) comprises a deflector (16) for deflecting at least one optical cable (15), wherein in a mounted position of the housing (2)

the deflector (16) is arranged in the area of the upper end of the housing (2); and (f) wherein the base (3) of the housing (2) comprises at least one adapter (17) to interconnect two optical connectors (18) to each other.

2. The SFO-box (1) according to claim 1, wherein the base (3) and/or the top (4) comprise at least one mounting means (9) suitable to receive at least one optical fan out module (6).

3. The SFO-box (1) according to claim 2, wherein the mounting means (9) comprises at least one retaining mandrel (9) onto which the at least one optical fan out module (6) can be pushed onto.

4. The SFO-box (1) according to claim 1, wherein the base (3) and the top (4) are in a mounted position interconnected to each other by first (12) and/or second screws (19).

5. The SFO-box (1) according to claim 1, wherein the base (3) and the top (4) are in a mounted position interconnected to each other by at least one hinge.

6. The SFO-box (1) according to claim 1, wherein the base (3) and the top (4) are made from bend sheet metal and/or injection molded plastic material.

7. The SFO-box (1) according to claim 1, wherein the opening (14) is formed by the base (3) and the top (4) of the housing (2).

8. An SFO-box system (10) comprising at least one SFO-box (1) according to claim 1 and a base plate (11) comprising third fastening means (13) suitable to connect to the second fastening means (8) of the base (3) of the housing (2).

* * * * *